United States Patent [19]
Kim et al.

[11] Patent Number: 5,684,377
[45] Date of Patent: Nov. 4, 1997

[54] APPARATUS FOR CONTROLLING AN INPUT POWER TO AN INDUCTION MOTOR

[75] Inventors: Tae-Seung Kim, Kyonggi-Do; Soon-Chan Hong, Seoul; Seung-Gi Jeong, Seoul; Seung-Chul Lee, Seoul, all of Rep. of Korea

[73] Assignee: Dongjin Trading Co., Ltd., Seoul, Rep. of Korea

[21] Appl. No.: 652,874

[22] Filed: May 23, 1996

[30] Foreign Application Priority Data

May 23, 1995 [KR] Rep. of Korea ............. 95-12821

[51] Int. Cl.$^6$ ............................................. H02P 7/622
[52] U.S. Cl. ............... 318/799; 318/729; 318/801; 318/809
[58] Field of Search .............................. 318/727, 729, 318/767, 798, 799, 800, 801, 805, 806, 809, 812

[56] References Cited

U.S. PATENT DOCUMENTS

| | | |
|---|---|---|
| 4,052,648 | 10/1977 | Nola . |
| 4,249,120 | 2/1981 | Earle .............................. 318/729 |
| 4,451,112 | 5/1984 | Hattori et al. ................. 318/778 |
| 5,153,489 | 10/1992 | Unsworth et al. ........... 318/729 X |
| 5,204,606 | 4/1993 | Kuwahara et al. ............ 318/800 |
| 5,241,256 | 8/1993 | Hatanaka et al. ............. 318/801 |
| 5,304,911 | 4/1994 | Anderson ...................... 318/729 |

*Primary Examiner*—Bentsu Ro
*Attorney, Agent, or Firm*—Anderson Kill & Olick P.C.

[57] ABSTRACT

An input power control apparatus for use with an AC induction motor adjusts a firing angle to allow the motor to run at near a rated speed of the motor and then to find a minimum power point at some voltage level in a variation of the applied voltage.

7 Claims, 5 Drawing Sheets

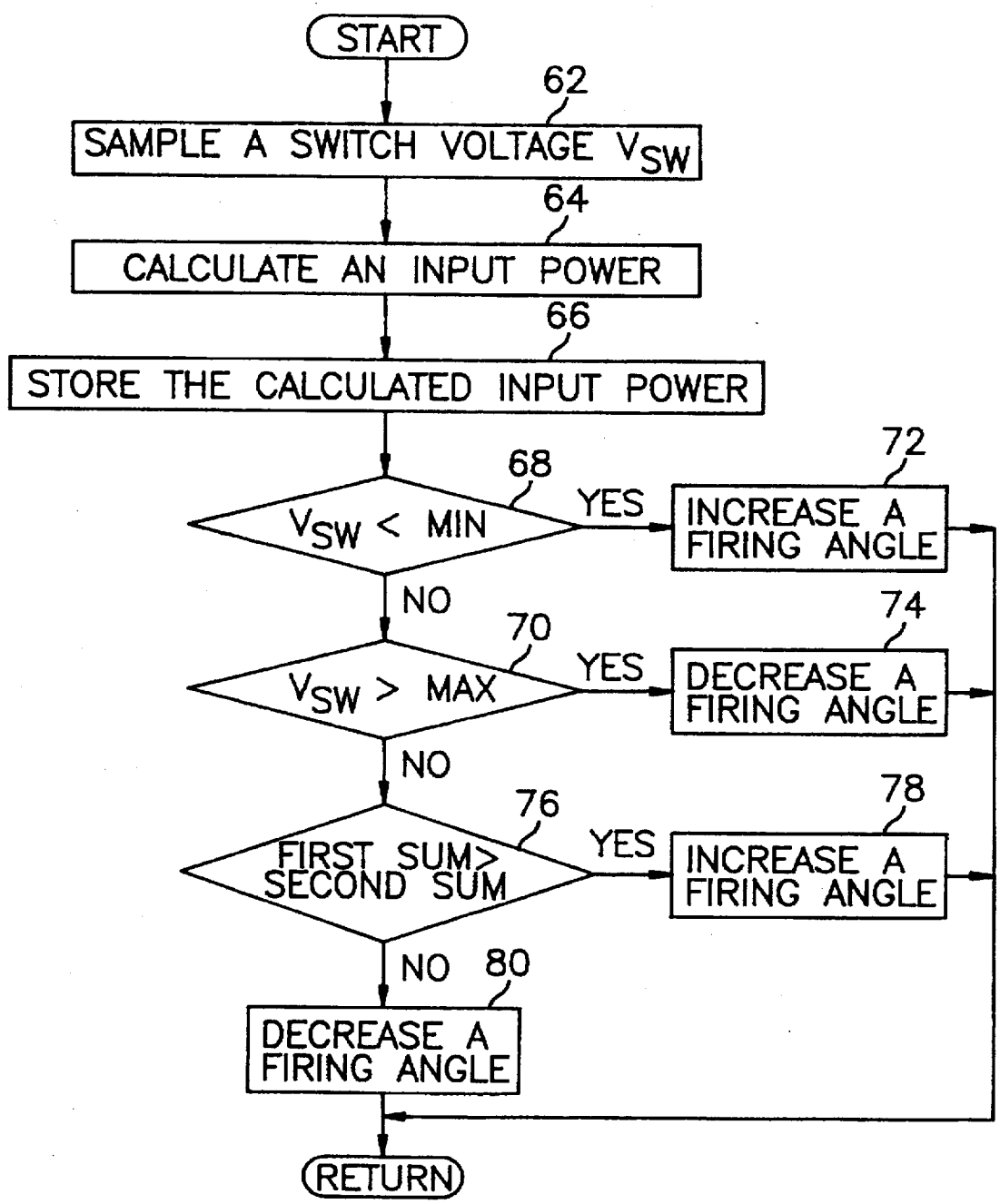

APPARATUS FOR CONTROLLING AN INPUT POWER TO AN INDUCTION MOTOR

FIELD OF THE INVENTION

The present invention relates to an AC induction motor; and, more particularly, to an apparatus for controlling an input power to an AC induction motor for energy saving.

DESCRIPTION OF THE PRIOR ART

An AC induction motor including three-phase or single-phase type is certainly one of the most commonly used in industrial and commercial applications. For an induction motor that runs at a constant speed, an efficiency of the induction motor can be improved by controlling an input voltage applied to the induction motor. It is known that under a lightly loaded condition, a reduction in the voltage applied leads to an energy saving in operating the motor, by achieving high efficiency for the given load condition. One of the most popular candidates for the energy saving is a thyristor ac voltage controller employing a power factor control technique. Such a technique is disclosed in U.S. Pat. No. 4,052,648, issued to F. J. Nola, wherein a line voltage and a current applied to an induction motor are sampled and a power input to the induction motor is decreased in proportion to a detected phase displacement between the current and the voltage applied to thereby provide less power to the induction motor. However, the constant power factor angle control system suggested by Nola is known not so effective in power saving under varying operating condition, e.g., changing load condition in an induction motor.

SUMMARY OF THE INVENTION

It is, therefore, an object of the present invention to provide an apparatus for controlling an input power to an AC induction motor for energy saving.

In accordance with the present invention, there is provided an apparatus for use with an AC induction motor having a switching device to apply an input power to the motor for controlling the input power, said apparatus comprising: means for detecting a phase voltage for each phase of the motor; means for deriving a phase signal from each of the phase voltages to determine a firing angle; means for detecting an input current for each phase of the motor; means for detecting a switch voltage across the switching device; means for sampling the detected switch voltage at a predetermined sampling rate; means for calculating an input power value drawn to the motor by averaging the summation of the products of the phase voltages and the currents whenever the detected switch voltage is sampled; means, having a plurality of memory locations, for storing the calculated input power values, wherein each of the calculated input power value is stored in a memory location indicated by the level of the sampled switch voltage corresponding thereto; means for comparing a first power sum with a second power sum, wherein the first power sum is the summation of the calculated input power values stored in a plurality of memory locations located at a lower level with respect to the level of the sampled switch voltage and the second power sum is the summation of the calculated input powers stored in the plurality of memory locations located at a higher level with respect to the level of the sampled switch voltage; and means for increasing the firing angle by a first predetermined amount at a time if the first power sum is greater than the second power sum and for decreasing the firing angle by the first predetermined amount at a time if the first power sum is less than the second power sum.

BRIEF DESCRIPTION OF THE DRAWINGS

The above and other objects and features of the present invention will become apparent from the following description of preferred embodiments, when taken in conjunction with the accompanying drawings, in which:

FIG. 6 presents a flow diagram explaining the control process of the controller shown in FIG. 2.

DETAILED DESCRIPTION OF THE PREFERRED EMBODIMENTS

Figure 1:
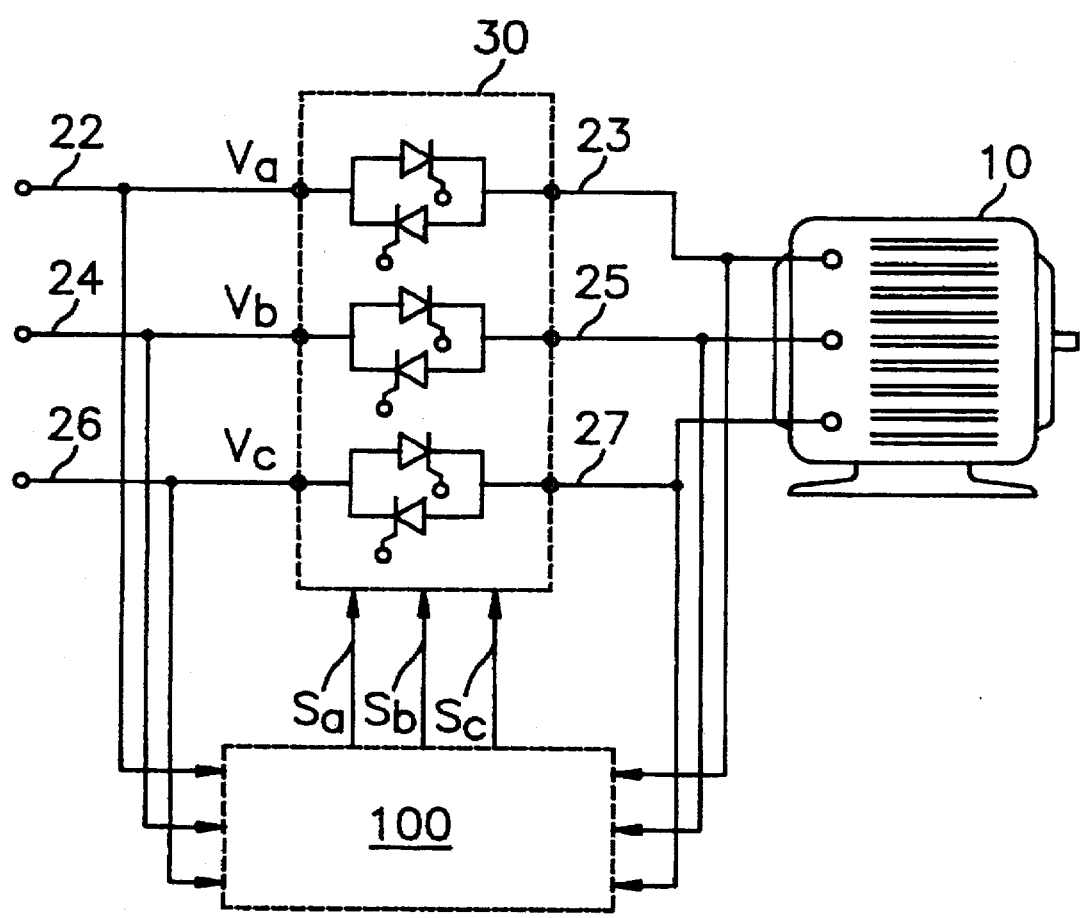
FIG. 1 shows a schematic diagram of an input power control apparatus for a three-phase AC induction motor in accordance with the present invention.

Referring to FIG. 1, there is shown a schematic diagram of an input power control apparatus 100 for use with a three-phase AC induction motor 10 in accordance with the present invention. A switching device 30 is placed in series with the induction motor 10 and includes three pairs of identical thyristors, each pair of thyristors being connected back-to-back in series with each phase of the induction motor 10, respectively. The respective thyristor pairs in the switching device 30 are conducted with thyristor gate control signals, Sa, Sb and Sc, from the control apparatus 100 so that each of input voltages, Va, Vb, Vc, on supply lines 22, 24, 26 is applied to its corresponding phases of the induction motor 10 through each of output terminals 23, 25, 27 of the switching device 30, which will be fully discussed hereinbelow with reference to FIG. 2.

Figure 2:
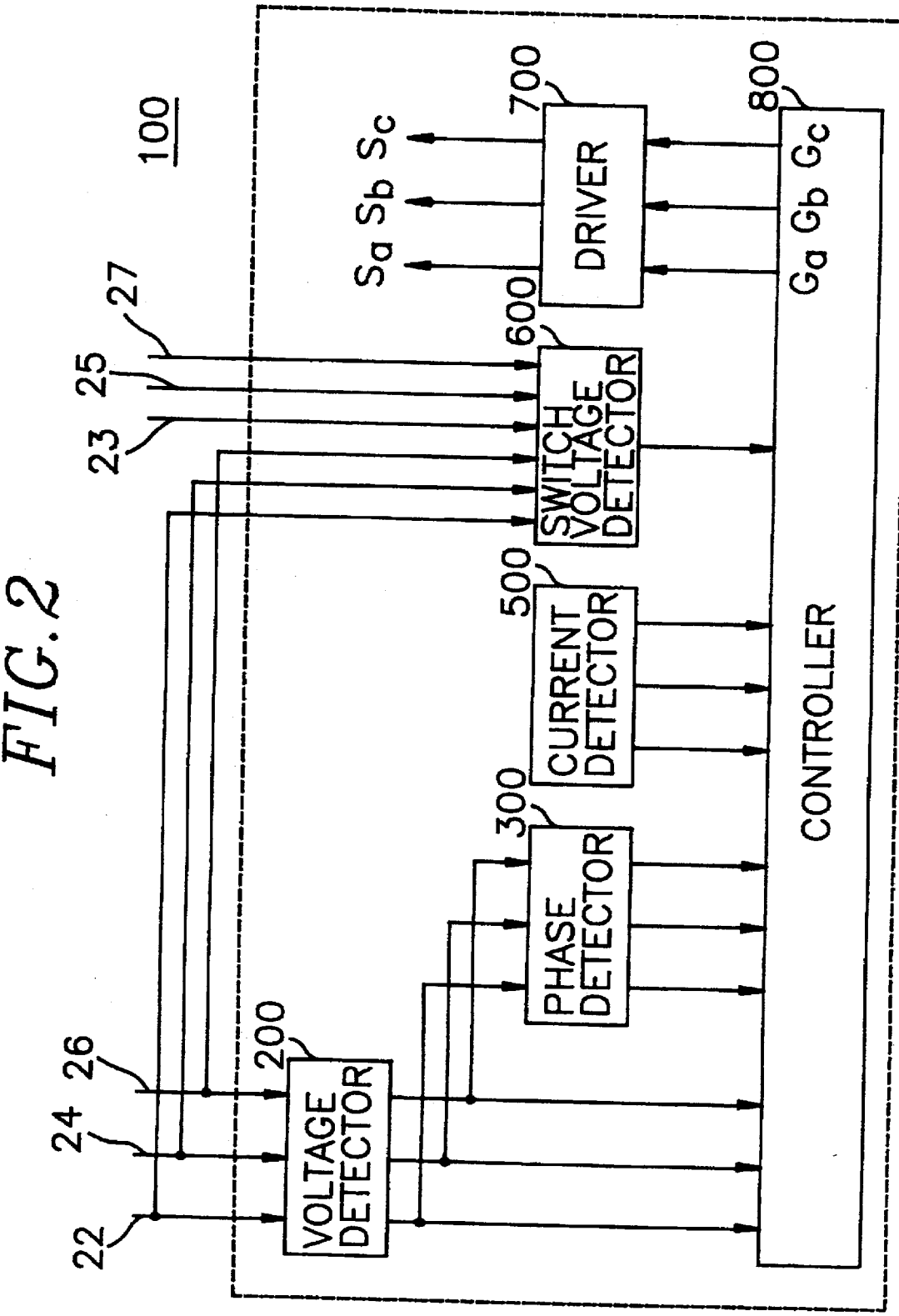
FIG. 2 represents a detailed block diagram of the input power control apparatus shown in FIG. 1.

In FIG. 2, the input power control apparatus 100 is shown to include a phase voltage detector 200, a phase detector 300, a phase current detector 500, a switch voltage detector 600, a driver 700 and a controller 800.

Figure 5A:
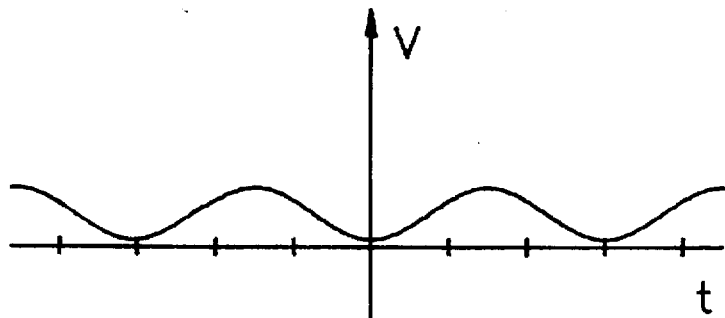
FIG. 5A to 5F provide a variety of waveforms generated from the present input power control apparatus.

The voltage detector 200 detects voltages for three phases of the motor 10 by using line voltages on the lines 24, 26. FIG. 5A shows only one of the measured phase voltages, which will be applied to the controller 800 and the phase detector 300.

Figure 5B:
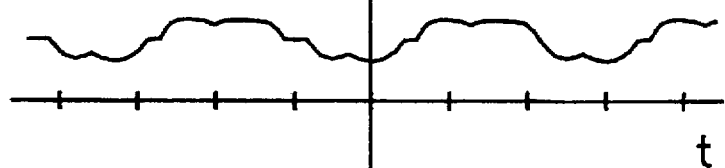

The current detector 500 measures an input current for each phase of the motor 10. FIG. 5B shows a measured current for one phase. The measured current for each phase is also provided to the controller 800 for measuring input power value drawn to the induction motor 10 in connection with the measured voltages.

Figure 5C:
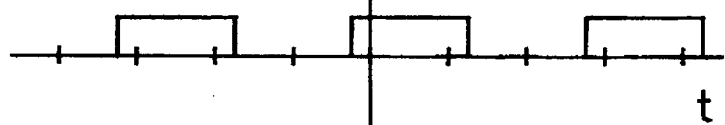

On the other hand, the phase detector 300 derives from each of the phase voltages a phase signal and provided the same to the controller 800. FIG. 5C represents only one of the detected phase signals wherein each of positive pulses represents a cycle of condcution of a thyristor in a forward direction in each thyristor pair and a zero-crossing point at a rising edge in each positive pulses represents a trigger point at which the thyristor is conducted. A distance delayed from the trigger point is referred to as a firing angle. The delay of the zero-crossing point leads to an increase of the firing angle, which results a decrease of a voltage applied to the motor.

Figure 5D:
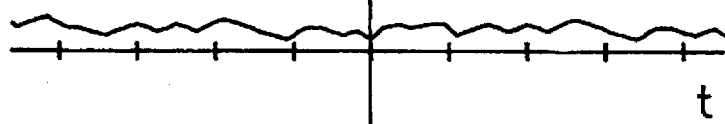
Figure 5E:
Figure 5F:

The switch voltage detector 600 measures an appropriate ac switch voltage across the switching device 30, wherein the measured switch voltage, as shown in FIG. 5D, is also provided to the controller 800. The driver 700, in response to a firing angle control signal for each phase, Ga, Gb, Gc, provided from the controller 800; generates the thyristor gate control signal, Sa, Sb Sc, to trigger each thyristor in each pair, as shown in FIG, 5E and 5F for a pair of thyristors.

In the controller 800, the switch voltage is sampled at a predetermined sampling rate and input power value for each phase is calculated at the sampling rate by averaging the summation of the products of the voltages and the currents. Each of the calculated power values is then stored in a look-up table 900 (shown in FIG. 4) incorporated in the controller 800. The controller 800 adjusts the firing angle based on the sampled switch Voltage and the calculated power value, resulting in a variation of a voltage applied to the motor, which, in turn, changes the speed of the motor.

In accordance with the invention, by adjusting the firing angle, the motor speed is adjusted near to a rated speed of the induction motor that gives a maximum efficiency of the motor. Thereafter, the controller finds a voltage level giving a minimum power by further varying the applied voltage. However, in case where the load of the motor is abruptly changed while a motor speed is kept constant, the applied voltage is accordingly changed, which, in turn, results in a loss of motor speed. Accordingly, in order to maintain the high efficiency of the motor, it is necessary to quickly adjust the motor speed to near the rated speed.

Figure 3:
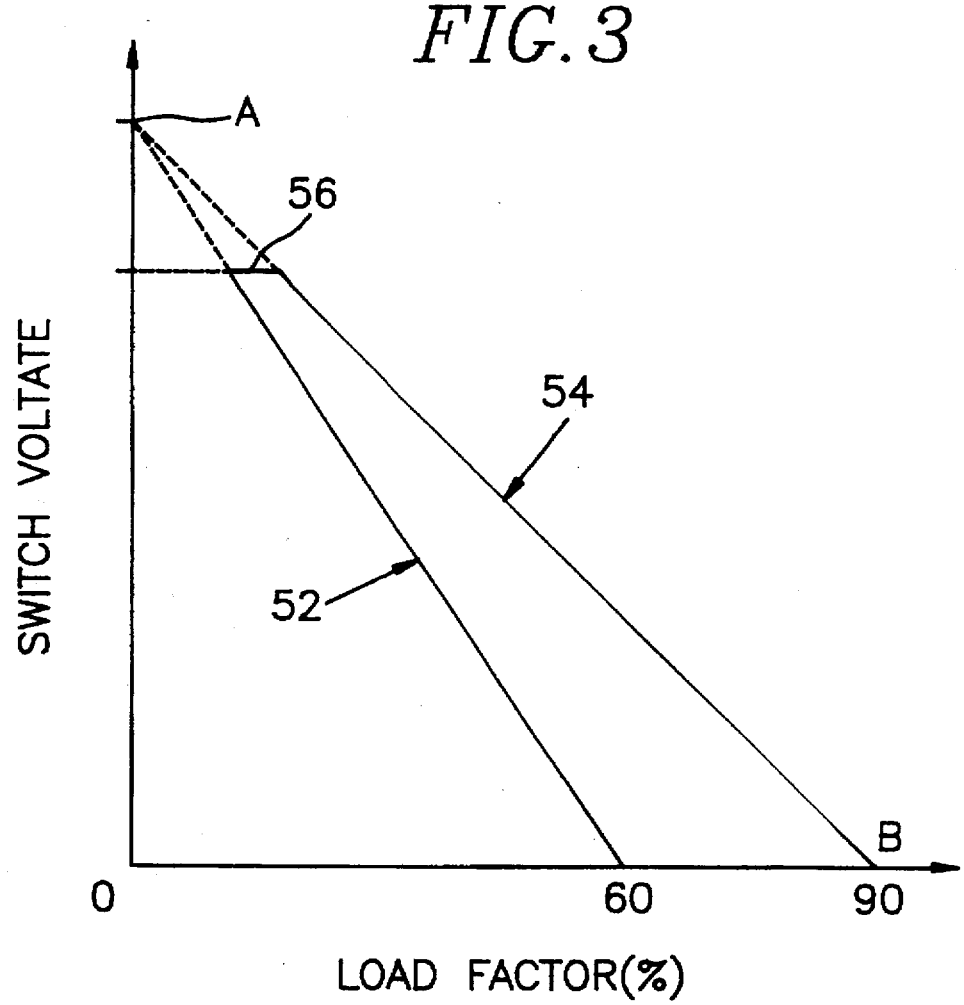
FIG. 3 illustrates a plot representing the relationship of switch voltage versus load factor.

In order to run the motor at near the rated speed, as shown in FIG. 3 which illustrates a plot of switch voltage versus load factor, the present invention employs a predetermined minimum switch voltage and a predetermined maximum switch voltage which have values below and above by some levels with respect to a switch voltage to be generated at the rated speed for a given load condition. As can be seen from FIG. 3, when a load approaches zero value, each of the predetermined minimum and maximum switch voltages converges to a point "A" of a peak switch voltage. The predetermined minimum switch voltage is set to be zero when a load factor is 60% and the maximum switch voltage is set to be zero when the load factor is 90%, which defines a minimum switch voltage line 52 by connecting the point A with 60% load point and a maximum switch voltage line 54 by connecting the point A with 90% load point. Accordingly, under a given load condition, the Y value on the Line 52 corresponding to the given load point gives the minimum switch voltage and the Y value on the line 54 corresponding to the given load point gives the maximum switch voltage for the given load. In this connection, the minimum and maximum switch voltage lines Y1 and Y2 can be defined as follows:

$$Y1=-(M/N1)X+M; \text{ and } Y2=-(M/N2)X+M$$

wherein M represents the peak switch voltage; and N1 and N2 represent a minimum load factor, i.e., 60% of the motor and a maximum load factor, i.e., 90%, of the motor, respectively. Accordingly, the predetermined minimum and the maximum switch voltages for a given load condition can be obtained from the equation.

If necessary, a memory can be employed to store the minimum and the maximum switch voltages for a set of preselected load points.

In accordance with the invention, the minimum and the maximum switch voltages are further limited to below 80% of the peak switch voltage, as indicated by a line 56, in order to avoid an extreme alternation of the motor speed occurred near the peak switch voltage.

For a given load condition, if the sampled switch voltage is less than the minimum switch voltage, the controller 800 increases the firing angle by a first predetermined amount at a time, thereby decreasing the applied voltage to the motor or lowering the motor speed, until a switch voltage to be sampled becomes greater than the minimum switch voltage; however, if the sampled switch voltage is greater than the maximum switch voltage, the controller 800 decrease the firing angle by the first predetermined amount at a time, thereby increasing the applied voltage to the motor or raising the motor speed, until a switch voltage to be sampled becomes less than the maximum switch voltage.

Once the motor is controlled to run at near the rated speed by measuring the sampled switch voltage, the controller 800 performs a minimum power process as is described hereinbelow.

Figure 4:
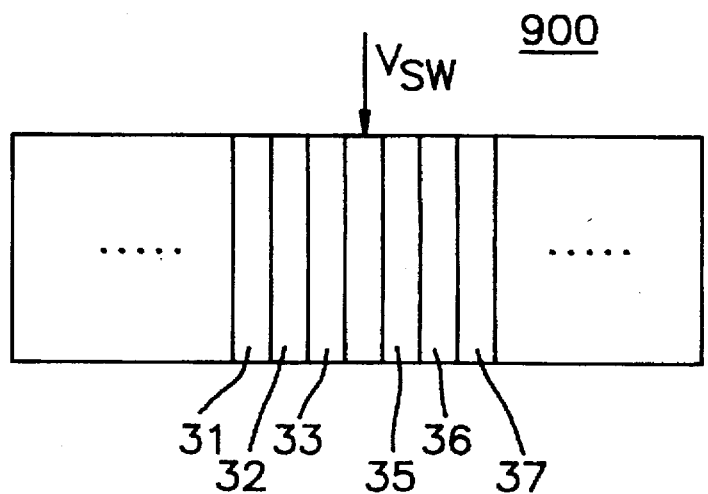
FIG. 4 presents an exemplary diagram of a look-up table for storing a calculated input power.

FIG. 4 shows an exemplary diagram of the look-up table 900 explaining the minimum power process in accordance with the invention.

As shown in FIG. 4, the look-up table 900 has a plurality of memory locations for storing the calculated power values, with a one-to-one correspondence to the level of the switch voltage shown in FIG. 3, wherein a calculated input power value previously stored in a memory location indicated by the level of the sampled switch voltage, corresponding thereto is updated with a new one when the switch voltage is sampled.

Then, whenever the calculated power value is stored in its corresponding memory location, the controller 800 compares a first power sum with a second power sum, wherein the first power sum is the summation of the input power values stored in a plurality of memory locations, e.g., at least three memory locations 31, 32, 33 located at a lower level with respect to the level of the sampled switch voltage, Vsw, and the second power sum is the summation of the input power values stored in a plurality of memory locations, e.g., at least three memory locations 35, 36, 37 located at a higher level with respect to the level of the sampled switch voltage, Vsw. If the first sum is greater than the second sum, then the controller 800 increasing the firing angle by a second predetermined amount at a time, to thereby decrease the applied voltage to the motor until the first sum equals to the second sum; otherwise, the controller 800 decreasing the firing angle by the second predetermined amount at a time, to thereby increase the applied voltage until the second sum becomes to equal to the first sum. Accordingly, by repeating the above operation, a minimum power point will be found at a certain position for a given load in FIG. 3.

In accordance with the invention, the first amount of the increment of the firing angle is greater than the second amount of the increment. Accordingly, the rated speed control responds much more quickly than the minimum power control in adapting to a rapid change of load condition. Such controller 800 may be implemented in a 80196 single chip microcontroller, which is available from Intel in USA.

FIG. 6 presents a flow diagram explaining the control operation executed by the controller of the present invention.

The control process begins with a step 62, wherein the controller 800 samples a switch voltage across the switching device at the sampling rate. And, in a step 64, an input power value is calculated when the switch voltage is sampled.

In a step 66, the calculated power is then stored in a memory location in the look-up table indicated by the level of the sampled switch voltage. Thereafter, in steps 68 and 70, the sampled switch voltage is compared with a minimum switch voltage and a maximum switch voltage to check whether the sampled switch voltage falls within therebetween. If it is determined that the sampled switch voltage is less than the minimum switch voltage, the control process passes to a step 72 to increase the firing angle by the first amount at a time until a switch voltage to be sampled becomes greater than the minimum switch voltage. On the contrary, if it is determined that the sampled switch voltage is greater than the maximum reference switch voltage, the control process flows to a step 74 to decrease the firing angle by the first amount at a time until a switch voltage to be sampled becomes less than the minimum switch voltage.

Once the sampled switch voltage falls within the limit range, the controller 800, as in step 76, compares a first sum and a second sum in the look-up table.

If it is determined that the first sum is greater than the second sum, the control process proceeds to a step 78 to increase the firing angle by the second predetermined amount at a time until the first sum equals to the second sum. Otherwise, the control process advances to a step 80 to decrease the firing angle by the second predetermined amount at a time until the second sum equals to the first sum.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for use with a three-phase AC induction motor having a switching device to apply an input power to the motor for controlling the input power, said apparatus comprising:

means for detecting a phase voltage for each phase of the motor;

means for deriving a phase signal from each of the phase voltages to determine a firing angle;

means for detecting an input current for each phase of the motor;

means for detecting a switch voltage across the switching device;

means for sampling the detected switch voltage at a predetermined sampling rate;

means for calculating an input power value drawn to the motor by averaging the summation of the products of the phase voltages and the currents whenever the detected switch voltage is sampled;

means, having a plurality of memory locations, for storing the calculated input power values, wherein each of the calculated input power value is stored in a memory location indicated by the level of the sampled switch voltage corresponding thereto;

means for comparing a first power sum with a second power sum, wherein the first power sum is the summation of the calculated input power values stored in a plurality of memory locations located at a lower level with respect to the level of the sampled switch voltage and the second power sum is the summation of the calculated input power values stored in the plurality of memory locations located at a higher level with respect to the level of the sampled switch voltage; and means for increasing the firing angle by a first predetermined amount at a time if the first power sum is greater than the second power sum and for decreasing the firing angle by the first predetermined amount at a time if the first power sum is less than the second power sum.

2. The apparatus of claim 1, further comprising:

means for providing a predetermined minimum switch voltage and a predetermined maximum switch voltage for a given load condition;

means for determining whether the sampled switch voltage is within the predetermined minimum switch voltage and the predetermined maximum switch voltage;

means for increasing the firing angle by a second predetermined amount at a time until a switch voltage to be sampled is greater than the minimum switch voltage if the sampled switch voltage is less than the minimum switch voltage and for decreasing the firing angle by the second predetermined amount at a time until a switch voltage to be sampled is greater than the maximum switch voltage if the sampled switch voltage is less than the maximum switch voltage.

3. The apparatus of claim 2, wherein the predetermined minimum switch voltage Y1 and the predetermined maximum switch voltage Y2 are defined as follows:

$$Y1=-(M/N1)X+M; \text{ and } Y2=-(M/N2)X+M$$

wherein M represents a peak switch voltage; and N1 and N2 represent a minimum load factor of the motor and a maximum load factor of the motor, respectively.

4. The apparatus of claim 3, wherein the minimum load factor is set at 60% and the maximum load factor is set at 90%.

5. The apparatus of claim 4, wherein the predetermined minimum switch voltage and the predetermined maximum switch voltage are further limited to below 80% of the peak switch value voltage.

6. The apparatus of claim 2, wherein the second predetermined amount of the increment of the firing angle is greater than the first predetermined amount of the increment of the firing angle.

7. The apparatus of claim 2, wherein said means for providing the minimum and the maximum switch voltages includes means for storing the values of the predetermined minimum switch voltage and the predetermined maximum switch voltage.

* * * * *